United States Patent
Patterson

(10) Patent No.: US 8,944,321 B1
(45) Date of Patent: *Feb. 3, 2015

(54) INFORMATION PROCESSING USING MACHINE-READABLE CODES

(71) Applicant: Melvin Patterson, Grass Valley, CA (US)

(72) Inventor: Melvin Patterson, Grass Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/325,556

(22) Filed: Jul. 8, 2014

Related U.S. Application Data

(63) Continuation of application No. 14/024,161, filed on Sep. 11, 2013, now Pat. No. 8,777,102.

(51) Int. Cl.
G06K 5/00 (2006.01)
G06F 21/31 (2013.01)

(52) U.S. Cl.
CPC .................................... G06F 21/31 (2013.01)
USPC ............................ 235/380; 235/487; 235/375

(58) Field of Classification Search
CPC .......... G06K 5/00; G06K 7/08; G06K 19/00; G06K 7/10; G06F 17/00; G07F 19/00; G06Q 40/00
USPC ............. 235/380, 487, 375, 451, 462.01, 379
See application file for complete search history.

(56) References Cited

U.S. PATENT DOCUMENTS

| | | | |
|---|---|---|---|
| 2009/0061884 A1 | 3/2009 | Rajan | |
| 2011/0307318 A1 | 12/2011 | LaPorte | |
| 2012/0209749 A1* | 8/2012 | Hammad et al. | 705/27.1 |
| 2012/0310827 A1* | 12/2012 | Gibson, III | 705/42 |
| 2012/0330769 A1* | 12/2012 | Arceo | 705/21 |
| 2012/0331567 A1 | 12/2012 | Shelton | |
| 2013/0209108 A1 | 8/2013 | Krishnakumar | |
| 2013/0256402 A1 | 10/2013 | Lim | |
| 2014/0032345 A1* | 1/2014 | Moore | 705/18 |
| 2014/0108252 A1* | 4/2014 | Itwaru et al. | 705/44 |
| 2014/0124580 A1* | 5/2014 | Yang et al. | 235/462.1 |
| 2014/0172531 A1* | 6/2014 | Liberty et al. | 705/14.23 |

OTHER PUBLICATIONS

U.S. Non-Final Office Action issued in U.S. Appl. No. 14/024,161 on Dec. 19, 2013, 7 pages.
U.S. Notice of Allowance for U.S. Appl. No. 14/024,161 dated Mar. 18, 2014, 8 Pages.

* cited by examiner

Primary Examiner — Edwyn Labaze
(74) Attorney, Agent, or Firm — Fish & Richardson P.C.

(57) ABSTRACT

Methods, systems, and apparatus, including computer programs encoded on a computer storage medium, for accessing, using an image capture device, a machine-readable code, the machine-readable code describing one or more rules that instruct a user device to determine whether the user satisfies one or more criteria; processing the machine-readable code to obtain the one or more rules; determining, based on the one or more obtained rules, that the user satisfies the one or more criteria; in response to determining, based on the one or more obtained rules, that the user satisfies the one or more criteria, displaying, on a display screen of the user device, data confirming that the user satisfies the one or more criteria.

20 Claims, 5 Drawing Sheets

INFORMATION PROCESSING USING MACHINE-READABLE CODES

CROSS-REFERENCE TO RELATED APPLICATION

This application is a continuation (and claims the benefit of priority under 35 USC 120) of U.S. application Ser. No. 14/024,161, filed Sep. 11, 2013, now allowed, which is incorporated by reference in its entirety.

BACKGROUND

This specification relates to selectively providing access to private information on a device in response to scanning a machine-readable code.

Machine-readable codes, e.g., bar codes or QR codes, can provide a visual representation of data that describes a product or service.

SUMMARY

Codes that describe addresses or Uniform Resource Locators (URLs) may appear in magazines, on billboard signs, or on almost any object about which users might need information. Users can interact with devices, e.g., mobile phones equipped with a camera, with a reader application to scan the code and, in response to scanning the code, be presented with text, contact information, or open a web page in the device's browser.

A first user operating a first user device can interact with a system to define one or more rules. The rules can be embedded in a machine-readable code, which, when scanned by a second user device, instruct the second user device to perform one or more actions, e.g., display certain types of information or perform various operations. For example, the rules can instruct the second user device to determine whether the second user pre-qualifies for a financial benefit, e.g., a credit card or loan. In another example, the rules can instruct the second user device to display, on a display screen of the second user device, relevant user information. The second user can present the displayed user information to a person or organization for authentication purposes, e.g., proving the user's identity or age, or to provide relevant personal information, e.g., providing proof of insurance. Once the rules have been defined, the system can generate a machine-readable code that encodes the defined rules.

The second user operating the second user device, e.g., a mobile device, can scan the generated machine-readable code, e.g., using a camera on a mobile device, for example, from a tangible surface, e.g., a wall, from the display screen of a different device, or magazine. In response to scanning the machine-readable code, software on the second user device can decode the machine-readable code to obtain the rules described by the machine-readable code. Once decoded, software on the second user device can process the rules to perform one or more actions that are described by the rules.

For example, the rules can instruct the second user device to determine whether the second user is qualified to enter an establishment that requires attendees to be at least of age 21, female, and a civil service employee. The second user device can access the second user's personal data that is stored on the second user device to determine whether the second user meets these requirements. In response to determining that the second user meets these requirements, the second user device can display, on a display of the second user device, that the second user is permitted to enter the establishment. Conversely, if the second user does not meet these requirements, e.g., if the second user is under age 21, then the second user device can display, on the display of the user device, that the second user is not permitted to enter the establishment.

As described in this specification, a user may need to be identified as "valid" before the user can scan codes. For example, to become "valid," the user can be verified by the Social Security Administration and/or the Department of Motor Vehicle (DMV). Once verified, the user is issued a personalized account number that can be used to verify the user's identity to others. The personalized account number can reference an account that stores the user's personal information that has been collected from various sources, e.g., the Social Security Administration, DMV, financial institutions, etc. The account referenced by the personalized account number can be updated when the user's personal information is updated in the various sources.

For example, if the user purchases a new house, an authorized entity, e.g., the realtor, can provide the DMV with the user's new house address. The DMV can update the user's driver's license with the new house address. Once the DMV updates the user's driver's license, the user's account that is referenced by the user's personalized account number is also updated.

The user can control which entities have permission to access the account that is referenced by the user's personalized account number. For example, if a bank wants to open a savings account for the user, the bank needs to be "valid," e.g., the bank has been verified by the Social Security Administration and/or the DMV and has been assigned a personalized account number. A bank representative can ask the user to scan a machine-readable code for opening the savings account. After scanning the machine-readable code, the user will be asked to allow the bank's representative to add the user's email address to receive an electronic monthly statement. The bank is authorized to email the user electronic monthly statements after the user approves the bank representative's request. If the bank ever decides to sell the user's email address to advertisers, the advertisers will not be able to email the user or view any of the user's personal information, since these advertisers have not been given permission by the user.

In general, one aspect of the subject matter described in this specification may be embodied in methods that involve accessing, using an image capture device, a machine-readable code, the machine-readable code describing one or more rules that instruct the user device to determine whether the user satisfies one or more criteria; processing the machine-readable code to obtain the one or more rules; determining, based on the one or more obtained rules, that the user satisfies the one or more criteria; and in response to determining, based on the one or more obtained rules, that the user satisfies the one or more criteria, displaying, on a display screen of the user device, data confirming that the user satisfies the one or more criteria.

Other embodiments of this aspect include corresponding systems, apparatus, and computer programs, configured to perform the actions of the methods, encoded on computer storage devices.

These and other embodiments can each optionally include one or more of the following features. The one or more rules instruct the user device to determine whether the user satisfies an age requirement, and wherein determining, based on the one or more obtained rules, that the user satisfies the one or more criteria comprises determining, using the data storage system, whether the user satisfies the age requirement. The one or more rules instruct the user device to determine whether the user satisfies a credit history requirement, and wherein determining, based on the one or more obtained rules, that the user satisfies the one or more criteria comprises determining, using the data storage system, whether the user has a clean credit history and has a threshold credit score.

Processing the machine-readable code to obtain the one or more rules comprises decoding the machine-readable code to obtain data describing the one or more rules. Processing the machine-readable code to obtain the one or more rules comprises decoding the machine-readable code to obtain data describing a Uniform Resource Locator; accessing a machine-readable code system using the Uniform Resource Locator; and obtaining, from the machine-readable code system, data describing the one or more rules. The machine-readable code is an optically-readable label that describes data. The one or more rules are defined using various programming languages or Boolean expressions In general, one aspect of the subject matter described in this specification may be embodied in methods that involve accessing, using an image capture device, a machine-readable code, the machine-readable code describing one or more rules that instruct the user device to display, on a display screen of the user device, information relating to the user; processing the machine-readable code to obtain the one or more rules; processing, using the data storage system, the one or more obtained rules that instruct the user device to display, on the display screen of the user device, information relating to the user; and in response to processing the one or more obtained rules that instruct the user device to display, on the display screen of the user device, information relating to the user, displaying, on the display screen of the user device, the information relating to the user.

Other embodiments of this aspect include corresponding systems, apparatus, and computer programs, configured to perform the actions of the methods, encoded on computer storage devices.

These and other embodiments can each optionally include one or more of the following features. The one or more rules instruct the user device to display, on a display screen of the user device, information relating to the user's credit history and wherein displaying, on the display screen of the user device, the information relating to the user comprises displaying, on the display screen, the user's credit score. The one or more rules instruct the user device to display, on a display screen of the user device, information relating to the user's insurance information, medical history, travel passport information, family background information, information relating to a background check, or a security clearance status. The machine-readable code to obtain the one or more rules comprises: decoding the machine-readable code to obtain data describing the one or more rules. Processing the machine-readable code to obtain the one or more rules comprises: decoding the machine-readable code to obtain data describing a Uniform Resource Locator; accessing a machine-readable code system using the Uniform Resource Locator; and obtaining, from the machine-readable code system, data describing the one or more rules. The machine-readable code is an optically-readable label that describes data.

Particular embodiments of the subject matter described in this specification can be implemented so as to realize one or more of the following advantages. Users can provide access to private information on a device in response to scanning a machine-readable code.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
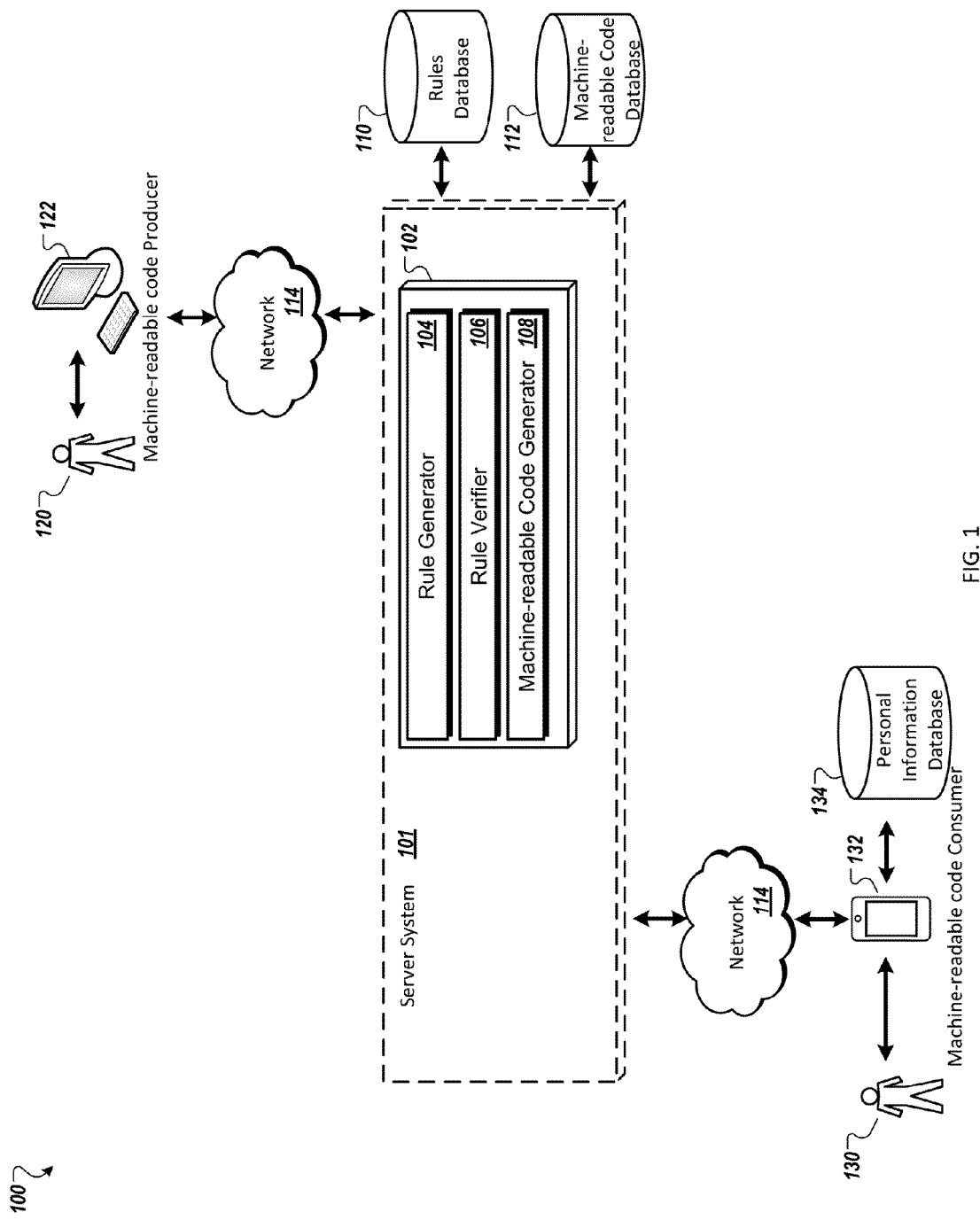
FIG. 1 illustrates an example machine-readable code-processing system used for generating and processing machine-readable codes.

FIG. 1 illustrates an example machine-readable code processing system 100 used for generating and processing machine-readable codes. A system 101, a user 120 interacting with a user device, e.g., a desktop or laptop computer, and a user 130 also interacting with a user device, are connected through a network 114. Some examples of user devices include computers, tablets, mobile devices, e.g., cellular phones, smart watches equipped with a camera, and wearable device equipped a camera.

The system 101 can be implemented as, for example, computer programs running on one or more computers in one or more locations that are in communication with each other through a network. The network 114 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

In general, the system 101 includes a rule generator 104, a rule verifier 106, and a machine-readable code generator 108. The system 101 can also communicate with one or more databases, e.g., a rules database 110 and a machine-readable code database 112, as described below. The system 101 can be used to generate machine-readable codes that, when scanned by a mobile device, can trigger one or more actions by the mobile device, as also described below.

The rule generator 104 is configured to present users with a graphical user interface (GUI) through which a user define rules that instruct devices to perform one or more actions. The rules can be used to generate machine-readable codes that describe the generated rules using the machine-readable code generator 108, as described below.

The system 101 can store, in a rules database 110, pre-defined rules that instruct devices to perform various actions. Users can interact with the GUI to select rules for use in generating a machine-readable code. For example, the pre-defined rules can include commonly performed actions including, for example, displaying a user's personal information, e.g., a user's name, age, date of birth, social security number, address, citizenship, or a combination thereof, on a display screen of a user device.

Other example pre-defined rules can instruct a user device to determine whether a user operating the user device satisfies one or more criteria. For example, a rule can specify that a user must be of a legal drinking age, e.g., age 21 or over, before being permitted to enter a particular establishment. Users can select one or more pre-defined rules from the rules database 110 to generate customized machine-readable codes for instructing user devices to perform specific actions.

The user 120 can interact with the GUI to select rules that are applicable. For example, if the user 120 is an owner of a bar, the user 120 may want to generate a machine-readable code that, when scanned by a user device, instructs the user device to display the user's age or that simply confirm that the user is of the legal drinking age. In such cases, the user 120 can select a pre-defined rule that instructs user devices to confirm that users meet a certain age requirement. Once the applicable rules are selected, the system 101 can generate a machine-readable code that describes the selected rules, as described below.

The user 120 can also interact with the GUI to input and/or define values for various parameters. The various parameters are used to define custom rules by, for example, using various programming languages and Boolean expressions. For example, assuming that the user 120 is an owner of a bar and wants to have a special event for female military veterans. In this example, the user 120 can interact with the GUI to define custom rules that confirm that a person satisfies an age of 21 or over, that the person is a female, and that the person is a military veteran. The system 101 can then generate a machine-readable code that describes these three rules.

In one example, the user 120 can print the generated machine-readable code and have it displayed at the entrance of the bar. In another example, the user 120 can display the generated machine-readable code on a display screen. When an individual enters the bar, the individual can interact with their user device to scan the displayed machine-readable code. In response to the scanning, the user device can determine, using the user's personal data that describes characteristics of the user, whether the individual satisfies these three requirements. A validation message indicating whether the individual satisfies these requirements can be displayed on a display screen of the user device. If the individual satisfies these requirements, the individual can gain entry into the bar, for example, by presenting the validation message to a person that authorizes entry into the bar.

In some implementations, the system 101 also includes a rule verifier 106 that is configured to validate rules selected or defined by users to confirm that such rules do not violate pre-defined rule policies. The pre-defined rule policies can be used to enforce the types of actions a machine-readable code can instruct a user device to perform based on the contextual usage of the machine-readable code.

For example, assuming that the user 120, an owner of a bar, attempts to define a rule that instructs a user device to display a user's social security number. When attempting to generate a machine-readable code that describes this rule, the rule verifier 106 can determine that, based on one or more pre-defined rule policies, an individual does not need to display their social security number to gain entry into a bar. In response to this determination, the rule verifier 106 can prevent the user 120 from generating the machine-readable code and can display an error indicating that the rule violates one or more pre-defined rule policies.

In some implementations, a user can configure the user device to perform additional validation of rules to determine whether the rules violate a custom rule policy. For example, a user may scan a machine-readable code to determine whether the user qualifies for a medical insurance plan. The scanned machine-readable code may include a rule that determines, based on the user's medical history, whether the user has undergone one or more surgeries. If the user does not want the rule to access the user's surgery history, the user can define a custom rule policy that prohibits rules from accessing the user's surgery history.

The system 101 also includes a machine-readable code generator 108 that is configured to generate machine-readable codes that describe rules that are selected or defined by users. As used in this specification, a machine-readable code, e.g., a Quick Response or QR code, is an optically-readable label that represents data. For example, the machine-readable code can represent data that describes words, numbers, images, or Uniform Resource Locators (URLs). In some implementations, the data describes one or more rules that instruct a user device to perform one or more actions. Each machine-readable code can be, for example, a two-dimensional label that consists of black modules, e.g., square dots, arranged in a square grid on a white background. Machine-readable codes can be read by an imaging device, e.g., a camera on a mobile device, and processed, by the device, using software to decode the data that is described by the machine-readable codes.

In some implementations, the system 101 can interact with a machine-readable code database 112 that stores pre-generated machine-readable codes for use in various situations. Machine-readable codes can be pre-generated for situations that are commonly encountered in everyday society. In such implementations, users can access the pre-generated machine-readable codes to instruct user devices to perform various actions without having to select or define their own rules in advance, as described below in reference to FIG. 4. Some examples of pre-generated machine-readable codes include machine-readable codes that instruct a user device to confirm personal information, e.g., name, date of birth, address, etc., confirm an age requirement, provide credit history, provide insurance information, provide medical history, provide driver's license information, provide travel passport information, provide family background information, and provide information relating to a background check.

In such implementations, the user 120 can request, from the system 101, pre-generated machine-readable codes for a particular purpose, as described below in reference to FIG. 4. For example, if the user 120 was involved in a car accident involving a user 130, the user 120 can request, using a user device 122 and from the system 101, a pre-generated machine-readable code that instructs a user device 132 to display insurance information for the user 130. Once the obtained pre-generated machine-readable code is displayed on a display screen of the user device 122, the user 120 can present the displayed machine-readable code to the user 130.

The user 130 can interact with software on the user device 132 to scan, using their user device 132, the machine-readable code being displayed by the user device 122. After scanning the machine-readable code, software on the user device 132 can process the scanned machine-readable code and, in response, perform one or more actions associated with the machine-readable code. In some implementations, after scanning the machine-readable code, the user device 132 communicates, over the network 114, data describing the scanned machine-readable code to the system 101 in lieu of decoding the machine-readable code. Instead, the system 101 identifies one or more rules that are associated with the machine-readable code, e.g., by looking up rules associated with the machine-readable label in the machine-readable code database 112. Once the rules have been identified, the server 101 can provide the identified one or more rules to the user device 132 for performing actions associated with the one or more rules.

In this example, the machine-readable code describes rules that instruct a user device to display a user's insurance information. When processing the rules, the user device 132 can interact with a personal information database 134 that stores data describing the user 130. Depending on the implementation, the personal information database 134 can be stored on the user device 132 or on a cloud storage service. The data describing the user 130 can include, for example, personal information, e.g., name, age, date of birth, address, social security number, marital status, etc., credit history, insurance information, e.g., insurance status, provider, contact information, etc., medical history, driver's license information, travel passport information, family background information, and information relating to background checks, e.g., security clearance status, etc.

The user device 132 can use data stored in the personal information database 134 to process the rules associated with the machine-readable code. In this example, the user device 132 can obtain, from the personal information database 134, data describing insurance information for the user 130. Once the data is obtained, the user device 132 can display, on a display screen of the user device 132, insurance information for the user 130. The user 130 can present the displayed insurance information to the user 120 as part of an insurance information exchange.

In some implementations, the user 120 operating the user device 132 is required to undergo a sign up process before machine-readable codes can be scanned and processed by the user device 132. In such implementations, the user verifies his or her identity with an authorized agency, e.g., a government agency. For example, the use can verify his or her identity to a representative of the agency by personally appearing at the agency's location and providing proper documentation, e.g., a driver's license or passport, that confirms the user's biographical information, e.g., name, date of birth, and photograph. The agency uses the user's biographical information to confirm the user's identity.

Once the user's identity has been confirmed, the agency issues the user with a unique identification number and a machine-readable code that encodes data describing the user, e.g., the user's name, address, date of birth, and photograph. The user then undergoes a secondary verification by presenting the agency-issued machine-readable code to a different authorized agent, e.g., a government agent. The agent can interact with a device to scan the user's agency-issued machine-readable code. In response to scanning the user's agency-issued machine-readable code, a display screen of the agent's device will display the user's biographical information, e.g., name, date of birth, and photograph.

The agent confirms the validity of the user's biographical information with the user's biographical information displayed on a government-issued identification card or with data stored on the user device 132. If the user's displayed biographical information is determined to be valid, the agent approves the user device 132 for scanning and processing machine-readable codes.

This verification process can be required for all users including the users, e.g., the user 120, that generate machine-readable codes.

In some implementations, once a user has obtained a unique identification number, the user's device can request various entities, e.g., creditors, vendors, landlords, financial consultants, etc., to begin sending detailed financial reports to the user's device. The entities can send detailed financial reports on an on-going bases, e.g., quarterly, or in response to a change in the user's financial history, e.g., when the user takes out a loan. This detailed financial information can be used by the user to determine whether the user is qualified for a particular item, e.g., credit card, house, car, etc., as described below in reference to FIG. 2.

Figure 2:
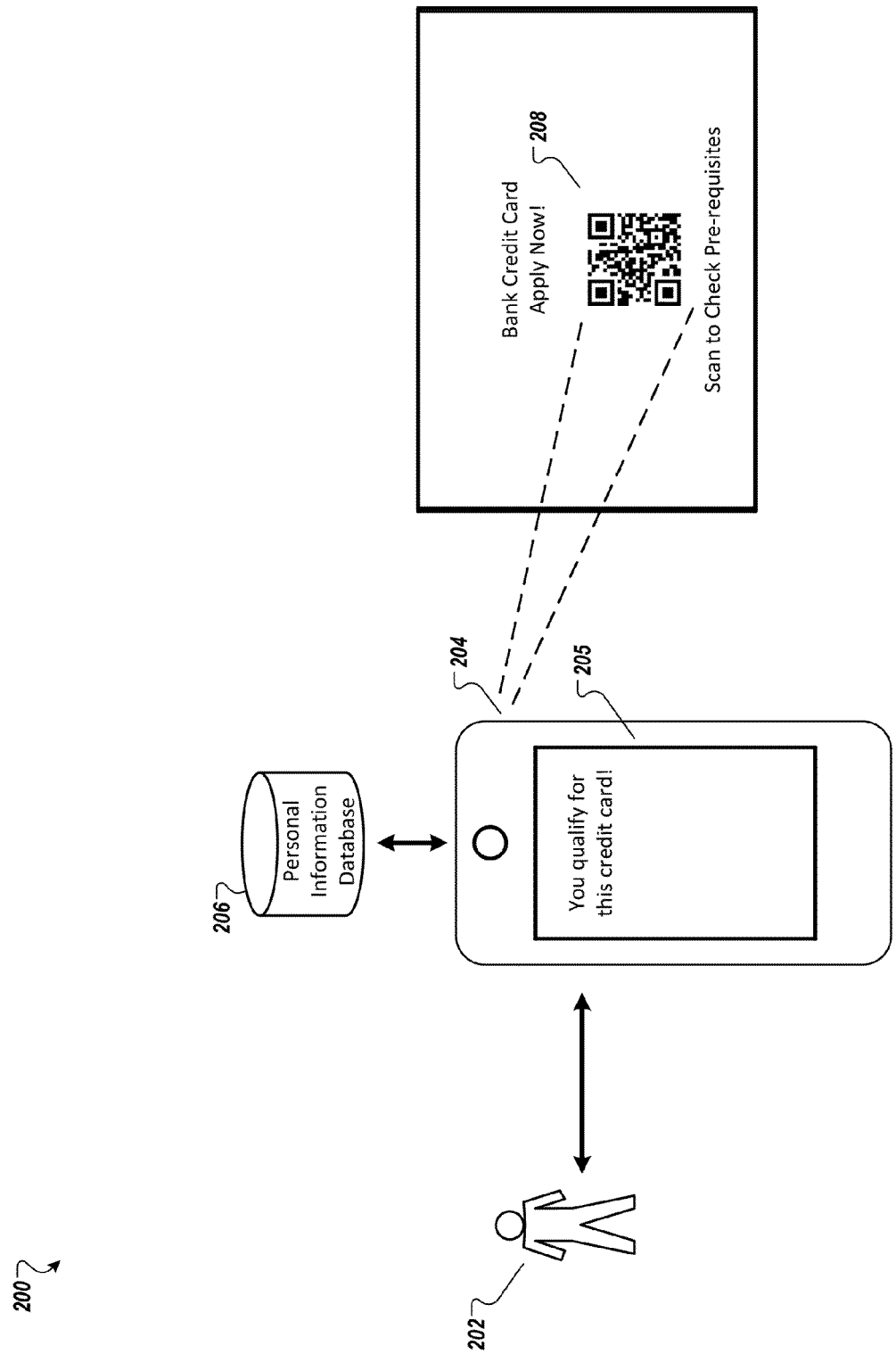
FIG. 2 illustrates an example in which a user scans a machine-readable code to determine whether the user is pre-qualified for a product or service.

FIG. 2 illustrates an example in which a user 202 scans a machine-readable code 208 to determine whether the user 202 is pre-qualified for a credit card. The machine-readable code 208 can be displayed, for example, in a magazine, on a brochure, on a billboard, or on a display screen.

The machine-readable code 208 can be generated on behalf of a financial institution that is offering the credit card. As described above, the machine-readable code 208 can describe one or more rules that instruct a user device to perform one or more actions. The rules can be selected or defined by the financial institution, as described above, to satisfy one or more criteria. In this example, the financial institution has specified rules that confirm that an applicant has a clean credit history and a credit score that exceeds 700.

A user 202 that wants to apply for the credit card and determine whether he or she is pre-qualified to obtain the credit card before actually applying for the card through the financial institution. In this example, the user 202 can interact with software on the user device 204 to scan the machine-readable code 208 using the user device 204. After scanning, software on the user device 204 can decode the rules that are described by the machine-readable code 208. In this example, the software identifies first rule that confirms that an applicant has a clean credit history and a second rule that confirms that the applicant's credit score that exceeds 700.

Once the rules have been identified, the user device 204 can interact with a personal information database 206 that stores personal information describing the user 202, as described above. Using the information stored in the personal information database 206, the user device 204 can process the identified rules to determine whether the user 202 has a clean credit history and has a credit score that exceeds 700. Once processing is complete, the user device 204 can present a message on a display screen 205 of the user device 204 indicating whether the user 202 pre-qualifies for the credit card.

Figure 3:
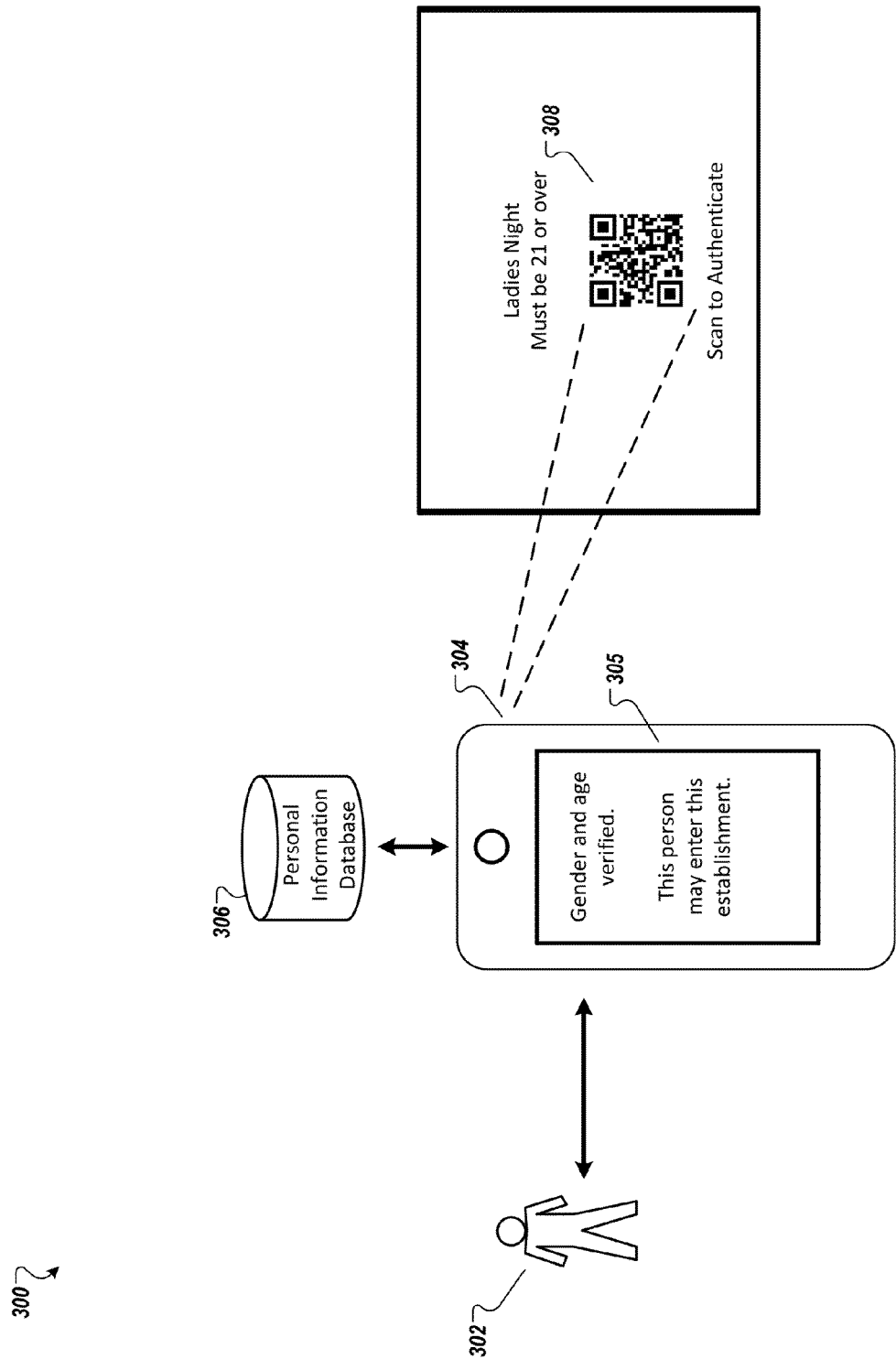
FIG. 3 illustrates an example in which a user scans a machine-readable code to provide relevant information that authenticates the user.

FIG. 3 illustrates an example in which a user 302 scans a machine-readable code 308 to provide relevant information that authenticates the user 302 to a retail establishment. The machine-readable code 308 can be displayed, for example, on a wall at the retail establishment or on a display screen.

As described above, the machine-readable code 308 can be generated on behalf of the retail establishment. The machine-readable code 308 can describe one or more rules that instruct a user device to perform one or more actions. The rules can be selected or defined by the retail establishment, as described above, to satisfy one or more criteria. In this example, the retail establishment has specified rules that confirm that a patron attempting to gain entrance to the retail establish is female and is of age 21 or over.

A user 302 that wants to enter the retail establishment can interact with software on the user device 304 to scan the machine-readable code 308 using the user device 304. After scanning, software on the user device 304 can decode the rules that are described by the machine-readable code 308. In this example, the software identifies first rule that confirms that the user 302 is female and of age 21 or over.

Once the rules have been identified, the user device 304 can interact with a personal information database 306 that stores personal information describing the user 302, as described above. Using the information stored in the personal information database 306, the user device 304 can process the identified rules to determine whether the user 302 is female and of age 21 or over. Once processing is complete, the user device 304 can present a message on a display screen 305 of the user device 304 indicating whether the user 302 meets the criteria for entering the retail establishment.

Figure 4:
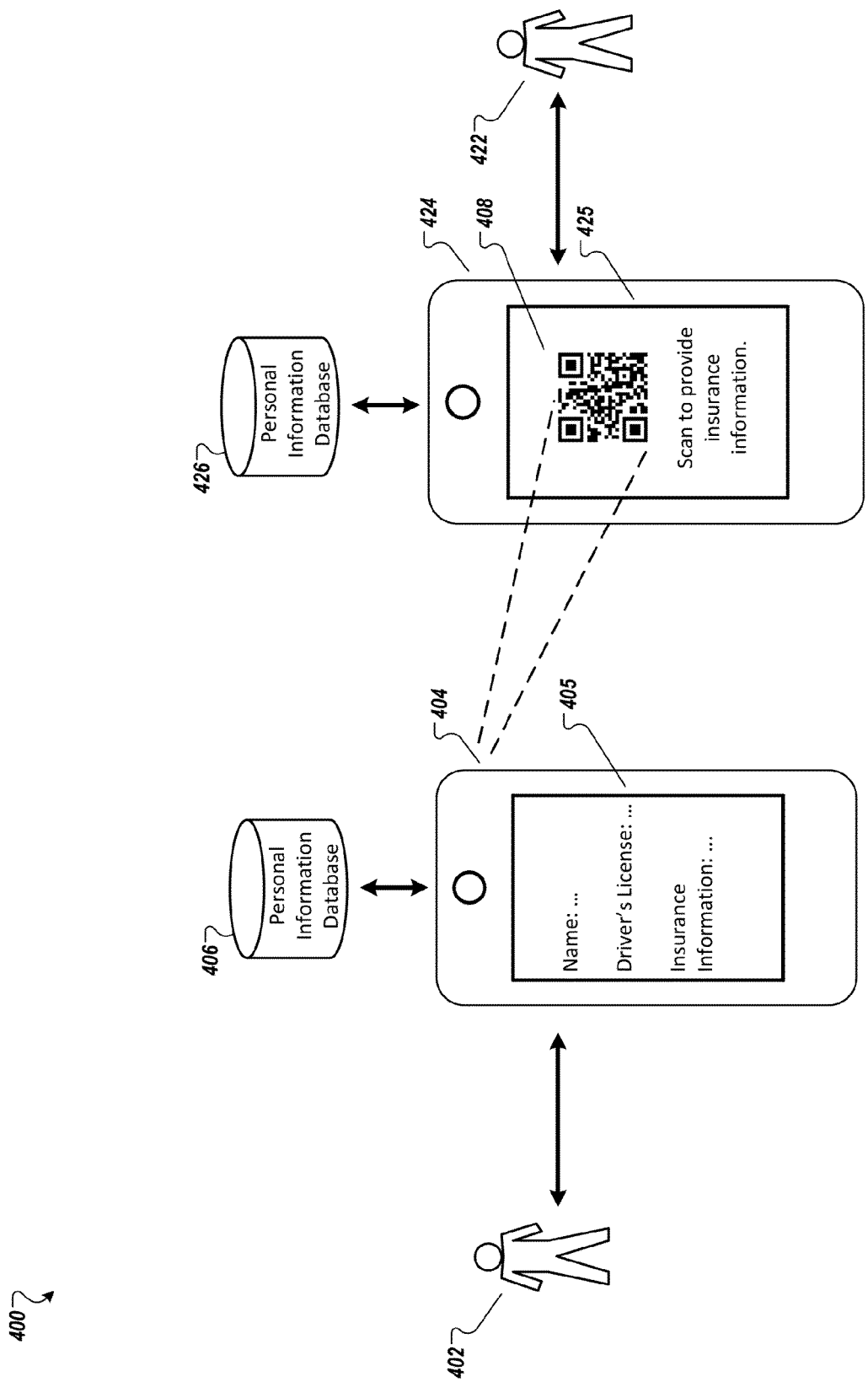
FIG. 4 illustrates an example in which a first user scans a machine-readable code that is presented by a second user to provide relevant information to the second user.

FIG. 4 illustrates an example in which a first user 402 scans a machine-readable code 408 that is presented on a user device 424 of a second user 422 to provide relevant information about the first user 402 to the second user 424. The machine-readable code 408 can be displayed, for example, on a display screen 425 of the user device 424.

The machine-readable code 408 can be generated on behalf of the second user 422 using rules specified by the second user 422. Alternatively, the second user 422 can obtain a pre-generated machine-readable code, from the system 101, that instructs a user device to display relevant information, as described above. The machine-readable code 408 can describe one or more rules that instruct a user device to perform one or more actions. In this example, the second user 422 has obtained a pre-generated machine-readable code 408 that describes rules that instruct a user device to display a user's insurance information. The second user 422 can use the machine-readable code 408 to obtain the first user's 402 insurance information, for example, after a car accident.

The first user 402 can provide the second user 422 with his or her insurance information by interacting with software on the user device 404 to scan the machine-readable code 408 using the user device 404. After scanning, software on the user device 404 can decode the rules that are described by the machine-readable code 408. In this example, the software identifies a rule that instructs the user device 404 to display insurance information for the user 402.

Once the rules have been identified, the user device 404 can interact with a personal information database 406 that stores personal information describing the user 402, as described above. Using the information stored in the personal information database 406, the user device 404 can process the identified rule to obtain insurance information for the user 402. Once processing is complete, the user device 404 can present the obtained insurance information on a display screen 405 of the user device 404.

In some implementations, users interacting with each other using machine-readable codes are required to undergo the sign up process described above.

In some implementations, a first user can require a second user to undergo additional verification before the first and second user can interact with one another using machine-readable codes. For example, if a banker wants to open a new financial account for a user, the banker needs to undergo the sign up process described above. Next, the banker can present, on a display screen of a device, a machine-readable code that identifies the banker to the user. The user can interact with a user device to scan and process the banker's machine-readable code. In response to processing the machine-readable code, the user device can verify the banker's identity and authorize the banker to perform various actions, e.g., open a bank account.

Additionally, for example, upon scanning the banker's machine-readable code, if the user authorizes the banker to communicate with the user by e-mail, then data describing the banker is added to a whitelist of entities that can contact the user. The banker can then send, to the user, correspondence, e.g., bank statements, by e-mail.

Entities, e.g., individuals or organizations, that are not listed on the user's whitelist of entities are prevented from contacting the user. Thus, if the banker sells the user's e-mail address to a third-party, and the third-party is not listed on the user's whitelist of entities, then the third-party will not be able to electronically contact the user. Additionally, the third-party will not be able to access any of the user's biographical information.

Figure 5:
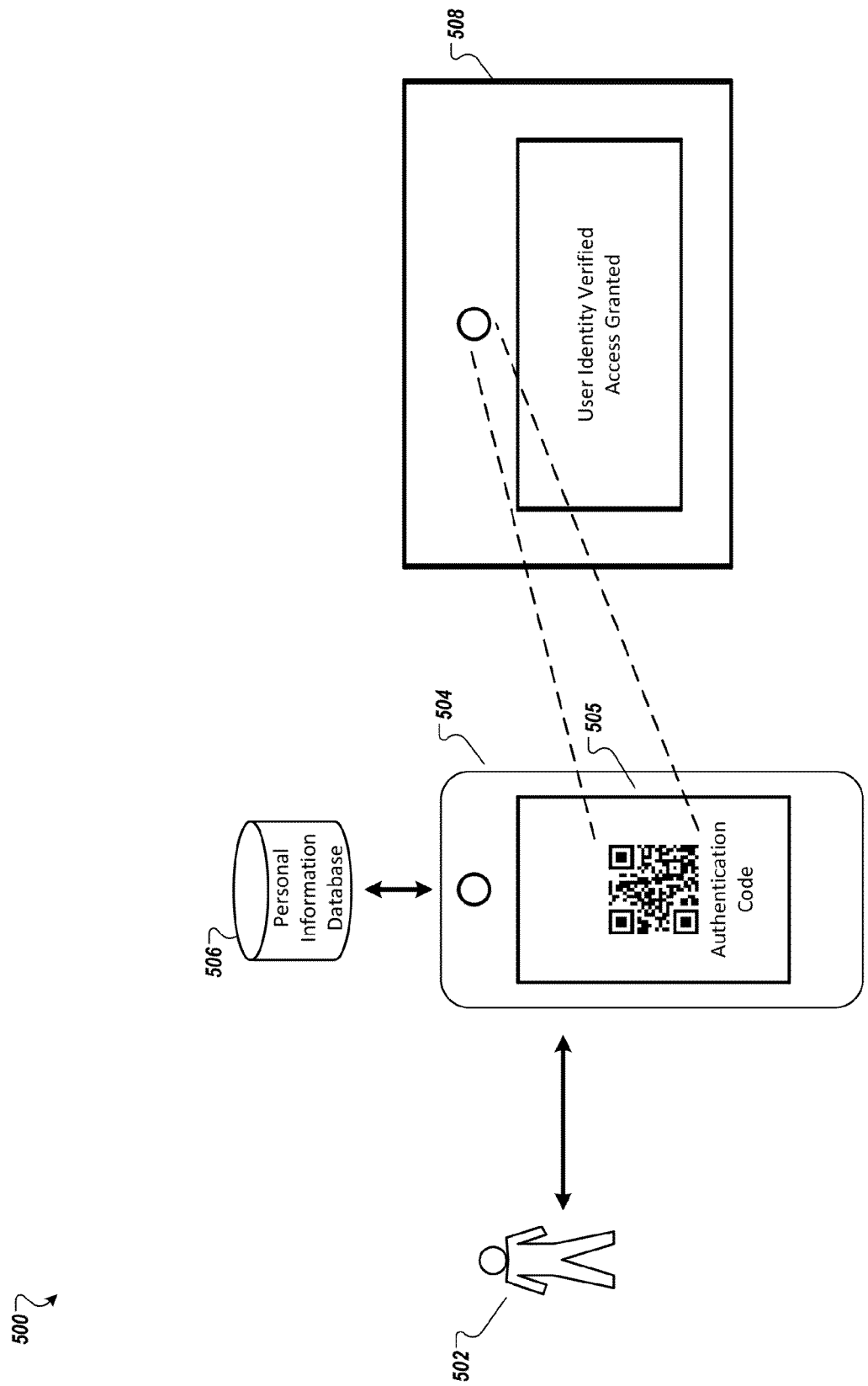
FIG. 5 illustrates an example in which a user presents a machine-readable code to an access control device to gain physical access to a building.

FIG. 5 illustrates an example in which a user 502 presents a machine-readable code 505 to an access control device 508 to gain physical access to a building. The machine-readable code 505 is displayed on a display screen of a user device 504.

As described above, the machine-readable code 505 can describe the user's biographical information, e.g., name, date of birth, photograph, and can be issued to the user 505 by an authorized agency.

A user 502 that wants to enter the building can interact with software on the user device 504 to display the machine-readable code 505 on a display screen of the user device 504. The user 502 can be authenticated by presenting the displayed machine-readable code 505 to the access control device 508.

The access control device 508 can scan and process the machine-readable code 505 to determine whether the machine-readable code 505 identifies an authorized individual. The access control device 508 can grant the user 502 access to the building upon determining that the user 502 is authorized to enter the building.

For example, an individual can program an access control device for their home to provide a cable repairperson entry into the home. The cable repairperson can interact with a device to present a machine-readable code identifying the cable repairperson to the access control device. Upon determining that the cable repairperson is authorized to enter the home, the access control device can unlock one or more doors to allow the cable repairperson to enter the home.

In situations in which the systems discussed here collect personal information, display personal information, or may make use of personal information, the users may be provided with an opportunity to control whether programs or features collect user information. In addition, certain data may be treated in one or more ways before it is stored or used, so that personally identifiable information is obscured.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   reading, by a mobile computing device, an optical machine-readable code;
   extracting, by the mobile computing device and from the optical machine-readable code, one or more rules for determining whether a user satisfies one or more criteria; and
   identifying, by the mobile computing device and from the optical machine-readable code, a requesting entity to receive a result of the determination made by a validating entity whether the user satisfies the one or more criteria;
   identifying, by the mobile computing device, the validating entity to determine whether information stored by the validating entity regarding the user satisfies the one or more criteria;
   obtaining, by the mobile computing device, a personal account number of the user, the personal account number associated with the information stored by the validating entity; and
   providing, by the mobile computing device and to the validating entity, (i) the personalized account number of the user, (ii) the one or more criteria, (iii) an indication of the requesting entity, and (iv) an instruction to send the result of the determination whether the user satisfies the one or more criteria to the requesting entity.

2. The method of claim 1, wherein reading an optical machine-readable code comprises scanning, using an optical sensor, an optical machine-readable code displayed by the requesting entity.

3. The method of claim 1, wherein obtaining a personal account number of the user comprises:
   receiving the personalized account number of the user from the validating entity before reading the optical machine-readable code;
   storing the personalized account number on the mobile computing device; and
   in response to reading the optical machine-readable code, accessing the personalized account number stored on the mobile computing device.

4. The method of claim 1, comprising:
   receiving an indication from the validating entity that the personalized account number of the user is valid.

5. The method of claim 1, wherein the optical machine-readable code includes an indication of a personalized account number for the requesting entity, the method comprising:
   determining that the personalized account number for the requesting entity is valid.

6. The method of claim 5, wherein determining that the personalized account number for the requesting entity is valid comprises:
   providing the personalized account number for the requesting entity to the validating entity; and
   receiving from the validating entity an indication that the personalized account number for the requesting entity is valid.

7. The method of claim 1, comprising:
   receiving, from the validating entity, the result of the determination.

8. A system comprising:
   one or more computers and one or more storage devices storing instructions that are operable, when executed by the one or more computers, to cause the one or more computers to perform operations comprising:
   reading, by a mobile computing device, an optical machine-readable code;
   extracting, by the mobile computing device and from the optical machine-readable code, one or more rules for determining whether a user satisfies one or more criteria; and
   identifying, by the mobile computing device and from the optical machine-readable code, a requesting entity to receive a result of the determination made by a validating entity whether the user satisfies the one or more criteria;
   identifying, by the mobile computing device, the validating entity to determine whether information stored by the validating entity regarding the user satisfies the one or more criteria;
   obtaining, by the mobile computing device, a personal account number of the user, the personal account number associated with the information stored by the validating entity; and
   providing, by the mobile computing device and to the validating entity, (i) the personalized account number of the user, (ii) the one or more criteria, (iii) an indication of the requesting entity, and (iv) an instruction to send the result of the determination whether the user satisfies the one or more criteria to the requesting entity.

9. The system of claim 8, wherein reading an optical machine-readable code comprises scanning, using an optical sensor, an optical machine-readable code displayed by the requesting entity.

10. The system of claim 8, wherein obtaining a personal account number of the user comprises:
    receiving the personalized account number of the user from the validating entity before reading the optical machine-readable code;
    storing the personalized account number on the mobile computing device; and
    in response to reading the optical machine-readable code, accessing the personalized account number stored on the mobile computing device.

11. The system of claim 8, the operations comprising:
receiving an indication from the validating entity that the personalized account number of the user is valid.

12. The system of claim 8, wherein the optical machine-readable code includes an indication of a personalized account number for the requesting entity, the operations comprising:
determining that the personalized account number for the requesting entity is valid.

13. The system of claim 12, wherein determining that the personalized account number for the requesting entity is valid comprises:
providing the personalized account number for the requesting entity to the validating entity; and
receiving from the validating entity an indication that the personalized account number for the requesting entity is valid.

14. The system of claim 8, comprising:
receiving, from the validating entity, the result of the determination.

15. A non-transitory computer-readable medium storing software comprising instructions executable by one or more computers which, upon such execution, cause the one or more computers to perform operations comprising:
reading, by a mobile computing device, an optical machine-readable code;
extracting, by the mobile computing device and from the optical machine-readable code, one or more rules for determining whether a user satisfies one or more criteria; and
identifying, by the mobile computing device and from the optical machine-readable code, a requesting entity to receive a result of the determination made by a validating entity whether the user satisfies the one or more criteria;
identifying, by the mobile computing device, the validating entity to determine whether information stored by the validating entity regarding the user satisfies the one or more criteria;
obtaining, by the mobile computing device, a personal account number of the user, the personal account number associated with the information stored by the validating entity; and
providing, by the mobile computing device and to the validating entity, (i) the personalized account number of the user, (ii) the one or more criteria, (iii) an indication of the requesting entity, and (iv) an instruction to send the result of the determination whether the user satisfies the one or more criteria to the requesting entity.

16. The medium of claim 15, wherein reading an optical machine-readable code comprises scanning, using an optical sensor, an optical machine-readable code displayed by the requesting entity.

17. The medium of claim 15, wherein obtaining a personal account number of the user comprises:
receiving the personalized account number of the user from the validating entity before reading the optical machine-readable code;
storing the personalized account number on the mobile computing device; and
in response to reading the optical machine-readable code, accessing the personalized account number stored on the mobile computing device.

18. The medium of claim 15, the operations comprising:
receiving an indication from the validating entity that the personalized account number of the user is valid.

19. The medium of claim 15, wherein the optical machine-readable code includes an indication of a personalized account number for the requesting entity, the operations comprising:
determining that the personalized account number for the requesting entity is valid.

20. The medium of claim 19, wherein determining that the personalized account number for the requesting entity is valid comprises:
providing the personalized account number for the requesting entity to the validating entity; and
receiving from the validating entity an indication that the personalized account number for the requesting entity is valid.

* * * * *